(12) United States Patent
Sheem et al.

(10) Patent No.: US 9,793,539 B2
(45) Date of Patent: Oct. 17, 2017

(54) NEGATIVE ELECTRODE FOR RECHARGEABLE LITHIUM BATTERY, RECHARGEABLE LITHIUM BATTERY INCLUDING SAME AND METHOD OF PREPARING RECHARGEABLE LITHIUM BATTERY

(71) Applicant: SAMSUNG SDI CO., LTD., Yongin-si, Gyeonggi-do (KR)

(72) Inventors: Kyeu-Yoon Sheem, Yongin-si (KR); Jake Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 85 days.

(21) Appl. No.: 13/861,332

(22) Filed: Apr. 11, 2013

(65) Prior Publication Data

US 2013/0288130 A1 Oct. 31, 2013

(30) Foreign Application Priority Data

Apr. 30, 2012 (KR) .......................... 10-2012-0045832

(51) Int. Cl.
*H01M 4/36* (2006.01)
*H01M 4/133* (2010.01)
(Continued)

(52) U.S. Cl.
CPC .......... *H01M 4/366* (2013.01); *H01M 4/0404* (2013.01); *H01M 4/133* (2013.01);
(Continued)

(58) Field of Classification Search
None
See application file for complete search history.

(56) References Cited

U.S. PATENT DOCUMENTS 6,365,299 B1 4/2002 Miyaki et al.
7,745,054 B2 6/2010 Kim et al.
(Continued)

FOREIGN PATENT DOCUMENTS

CN 1189247 A 7/1998
CN 1494173 A 5/2004
(Continued)

OTHER PUBLICATIONS

Ogihara, N., et al., Disordered carbon negative electrode for electrochemical capacitors and high-rate batteries, Electrochimica Act 52 (2006) 1713-1720, Elsevier Ltd., 8 pages.
(Continued)

*Primary Examiner* — Patrick Ryan
*Assistant Examiner* — Haixia Zhang
(74) *Attorney, Agent, or Firm* — Lewis Roca Rothgerber Christie LLP

(57) ABSTRACT

A negative electrode for a rechargeable lithium battery that includes a negative active material layer including a carbon-based material having a peak of about 20 degrees to 30 degrees at a (002) plane in an X-ray diffraction pattern using a CuKα ray, and an SEI (solid electrolyte interface) passivation film including at least one material selected from an organic material and an inorganic material and having an average thickness of about 10 nm to about 50 nm on the surface of the active material layer of the electrode.

8 Claims, 1 Drawing Sheet

(51) Int. Cl.
   *H01M 4/587*    (2010.01)
   *H01M 10/0525*  (2010.01)
   *H01M 10/058*   (2010.01)
   *H01M 10/44*    (2006.01)
   *H01M 4/04*     (2006.01)
   H01M 4/02       (2006.01)

(52) U.S. Cl.
   CPC ......... *H01M 4/587* (2013.01); *H01M 10/058* (2013.01); *H01M 10/0525* (2013.01); *H01M 10/446* (2013.01); H01M 2004/021 (2013.01); Y10T 29/49115 (2015.01)

(56) References Cited

U.S. PATENT DOCUMENTS

| | | | |
|---|---|---|---|
| 2002/0114993 | A1* | 8/2002 | Miyaki et al. ............. 429/137 |
| 2004/0106037 | A1* | 6/2004 | Cho et al. ............... 429/144 |
| 2007/0037063 | A1* | 2/2007 | Choi et al. .............. 429/330 |
| 2012/0040249 | A1  | 2/2012 | Sheem et al. |
| 2012/0045695 | A1* | 2/2012 | Sheem et al. ............ 429/231.8 |

FOREIGN PATENT DOCUMENTS

| | | |
|---|---|---|
| JP | 08-264183       | 10/1996 |
| JP | 2000-215918 A   | 8/2000 |
| JP | 2001-250534 A   | 9/2001 |
| JP | 2001-250535 A   | 9/2001 |
| JP | 2002-208440 A   | 7/2002 |
| JP | 2002-373646 A   | 12/2002 |
| JP | 2003-263984 A   | 9/2003 |
| JP | 2004-158453 A   | 6/2004 |
| JP | 2008-103345 A   | 5/2008 |
| KR | 10-2004-0071510 A | 8/2004 |
| KR | 10-2004-0085960 | 10/2004 |
| KR | 10-2004-0086920 | 10/2004 |
| KR | 10-2006-0075043 | 7/2006 |
| KR | 10-2007-0006955 A | 1/2007 |
| KR | 10-2012-0021678 | 3/2012 |

OTHER PUBLICATIONS

Yazami, R., Surface chemistry and lithium storage capability of the graphite-lithium electrode, Electrochimica Acta 45 (1999) 87-97, Elsevier Science Ltd., 11 pages.

English Machine Translation of Japanese Publication No. JP 2002-373646 A, 12 pages.

English Machine Translation of Japanese Publication No. JP 2003-263984 A, 11 pages.

Wang, C., et al. *Irreversible capacities of graphite anode for lithium-ion batteries*, Journal of Electroanalytical Chemistry, vol. 519, No. 1-2, Feb. 8, 2002, pp. 9-17.

EPO Search Report dated Aug. 7, 2013, for corresponding European Patent application 13165315.6, (7 pages).

U.S. Office action dated Dec. 4, 2014, for cross reference U.S. Appl. No. 13/749,150, (16 pages).

Edström, K., et al., *The cathode-electrolyte interface in the Li-ion battery*, Electrochimica Acta 50, (2004), pp. 397-403.

Dedryvère, R., et al., *Surface film formation on electrodes in a $LiCoO_2$/graphite cell: A step by step XPS study*, Science Direct, Journal of Power Sources, vol. 174, (2007), pp. 462 468.

Patent Abstracts of Japan, and English machine translation of Japanese Publication 08-264183 dated Oct. 11, 1996, (10 pages).

U.S. Advisory dated Jul. 22, 2015, for cross reference U.S. Appl. No. 13/749,150, (3 pages).

U.S. Office action dated May 6, 2015, for cross reference U.S. Appl. No. 13/749,150, (14 pages).

U.S. Office action dated Oct. 2, 2015, for cross reference U.S. Appl. No. 13/749,150, (16 pages).

U.S. Office action dated Feb. 2, 2016, for cross reference U.S. Appl. No. 13/749,150, (16 pages).

Song, S.W. et al.; "Surface Film Formation on $LiNi_{0.8}Co_{0.15}Al_{0.05}O_2$ Cathodes Using Attenuated Total Reflection IR Spectroscopy"; Journal of the Electrochemical Society; vol. 151; No. 8; 2004; pp. A1162-A1167.

CN Office action dated Apr. 12, 2016 for corresponding CN Application No. 201310142726.4, 6pp.

KIPO Notice of Allowance dated Sep. 28, 2016, for corresponding Korean Patent Application No. 10-2012-0045832 (5 pages).

U.S. Office action dated Oct. 7, 2016, for cross reference U.S. Appl. No. 13/749,150 (10 pages).

JPO Office Action dated Apr. 4, 2017, for corresponding Japanese Patent Application No. 2013-093954 (4 pages).

Verma et al., "A review of the features and analyses of the solid electrolyte interphase in Li-ion batteries," Electrochimica Acta, vol. 55, 2010, pp. 6332-6341.

Vetter et al, "Ageing mechanisms in lithium-ion batteries," Journal of Power Sources, vol. 147, 2005, pp. 269-281.

EPO Office Action dated Dec. 19, 2016, for corresponding European Patent Application No. 13165315.6 (6 pages).

\* cited by examiner

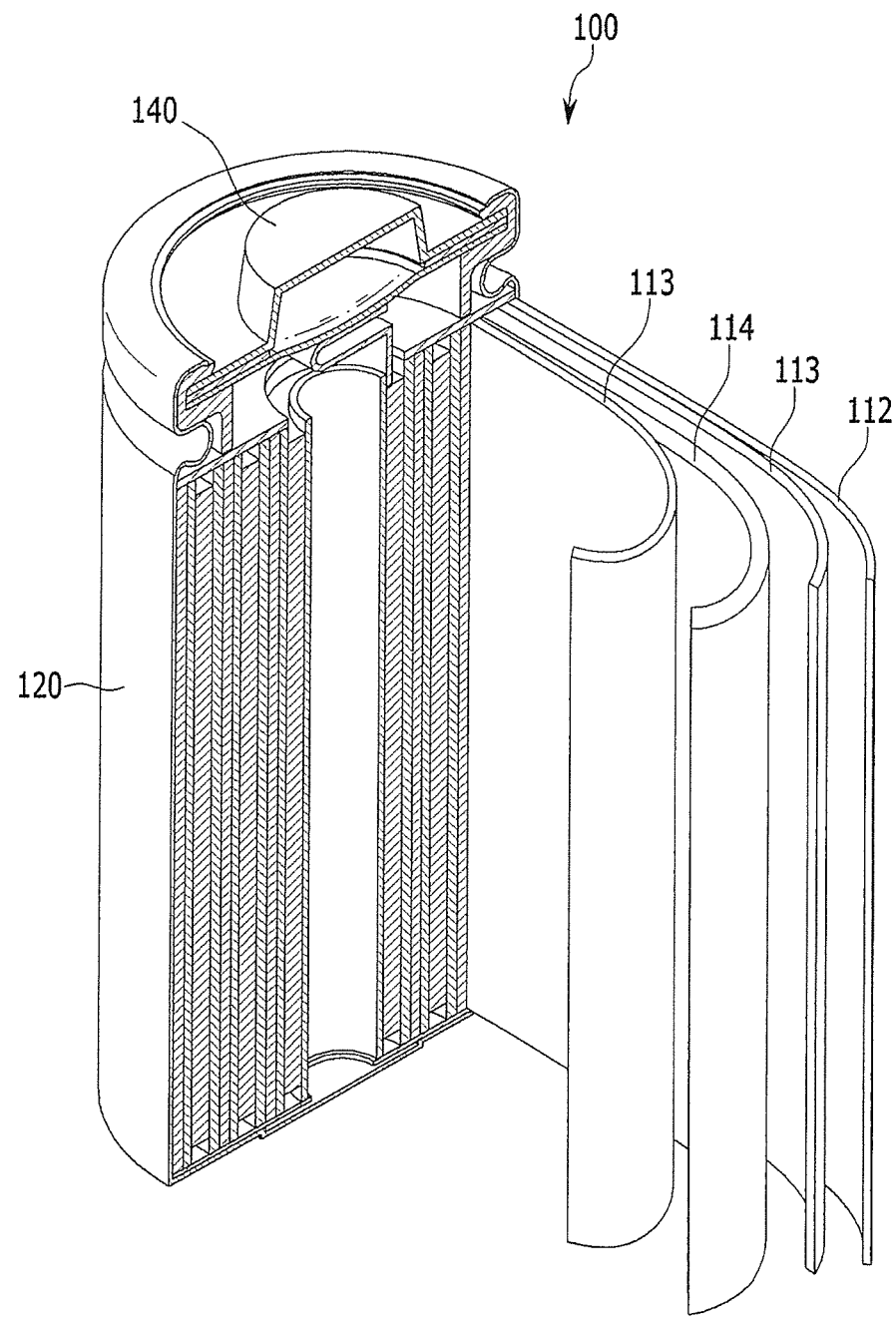

NEGATIVE ELECTRODE FOR RECHARGEABLE LITHIUM BATTERY, RECHARGEABLE LITHIUM BATTERY INCLUDING SAME AND METHOD OF PREPARING RECHARGEABLE LITHIUM BATTERY

CROSS-REFERENCE TO RELATED APPLICATION

This application claims priority to and the benefit of Korean Patent Application No. 10-2012-0045832, filed in the Korean Intellectual Property Office on Apr. 30, 2012, the entire content of which is incorporated herein by reference.

BACKGROUND

1. Field

This disclosure relates to a negative electrode for a rechargeable lithium battery, a rechargeable lithium battery including the same, and a method of preparing a rechargeable lithium battery.

2. Description of the Related Art

Recently, due to reductions in size and weight of portable electronic equipment, there has been a need to develop suitable batteries for the portable electronic equipment that has both high performance and large capacity. Here, a rechargeable lithium battery includes a positive electrode (including a positive active material capable of intercalating/deintercalating lithium ions), a negative electrode (including a negative active material capable of intercalating/deintercalating lithium ions), and an electrolyte.

When the negative active material is amorphous carbon and graphite, lithium ions are intercalated into carbon of a negative electrode and form an SEI (solid electrolyte interface) film on the surface thereof. The SEI passivation film can be referred to as a membrane for passing not electrons but lithium ions and helps the negative electrode work properly.

However, as the SEI passivation film becomes thicker, an insulation layer becomes thicker, thereby increasing interface resistance. In addition, when the SEI passivation film is too porous and not firm, the SEI passivation film may be broken by a physical impact due to contraction/expansion of negative active material particles during the charge and discharge, thereby exposing the surface of a negative active material layer to an electrolyte solution.

Herein, the exposed surface of the negative active material layer results in a reduction reaction with the electrolyte and forms a new SEI passivation film thereon. Since a high-capacity battery fully charges and fully discharges relatively slowly at a low C-rate up to a range of about 3V to about 4.3V, an active material may not undergo abrupt lattice changes. In addition, the active material has a volume change at a very low rate.

Accordingly, an additive for preventing decomposition of the electrolyte, for example, vinylene carbonate (VC), fluoroethylene carbonate (FEC), and the like should be added to the active material to form a thin SEI passivation film and thus, suppressing the decomposition of the electrolyte. However, unlike the high-capacity battery, the surface of an active material layer needs to be newly designed because of an increasing request of high rate output/high rate input and the like from consumers.

A conventional SEI passivation film may suppress a positive lithium source but has a problem of being easily deteriorated by its abrupt volume contraction/expansion on the surface of negative active material particles due to high-rate input and output, which keeps exposing the surface of the negative active material layer. Accordingly, the active material particles have sharply increased interface resistances on their surfaces and thus, deteriorating their cycle-life as well as generating undesired gas.

SUMMARY

An aspect of an embodiment of the present invention is directed toward a negative electrode for a rechargeable lithium battery that may be operated during high-rate charge and discharge without degradation.

An aspect of an embodiment of the present invention is directed toward a rechargeable lithium battery including the negative electrode for a rechargeable lithium battery.

An aspect of an embodiment of the present invention is directed toward a method of preparing the negative electrode for a rechargeable lithium battery.

According to one embodiment of the present invention, provided is a negative electrode for a rechargeable lithium battery that includes a negative active material layer including a carbon-based material having a peak of about 20 degrees to 30 degrees at a (002) plane in an X-ray diffraction pattern using a CuKα ray, and an SEI (solid electrolyte interface) passivation film including at least one material selected from an organic material and an inorganic material and having an average thickness of about 10 nm to about 50 nm on the surface of the negative active material layer of the electrode.

The carbon-based material may include at least one selected from soft carbon and graphite, and the carbon-based material may have an average particle diameter of about 1 um to about 20 um.

The organic material may include at least one selected from $ROCO_2Li$ (R is a C1 to C10 alkyl group), $R^1(OCO_2CH_2CH_2)_nLi$ ($R^1$ is a C1 to C10 alkyl group, and n is an integer ranging from about 1 to about 25), $R^2(CH_2CH_2O)_mLi$ ($R^2$ is a C1 to C10 alkyl group, and m is an integer ranging from about 1 to about 25), and $NR^3R^4R^5$ ($R^3$, $R^4$ and $R^5$ are C1 to C10 alkyl groups).

The inorganic material may include at least one selected from $LiF$, $Li_2O$, $Li_2CO_3$ and $Li_xPF_yO$ ($0<x\leq1$, $1\leq y\leq4$).

The SEI passivation film may include about 30 wt % to about 70 wt % of LiF based on the total amount of the SEI passivation film.

When the SEI passivation film is divided into first and second layers with equal thicknesses, the first layer forms the surface of the SEI passivation film, while the second layer is beneath the first layer. Here, the first layer may include the inorganic material in an amount of greater than or equal to about 60 wt % and the organic material in an amount of less than or equal to about 40 wt % based on the entire weight of the first layer, while the second layer may include the organic material in an amount of greater than or equal to about 60 wt % and the inorganic material in an amount of less than or equal to about 40 wt % based on the entire weight of the second layer. In addition, the first layer of the SEI passivation film may include LiF in an amount ranging from about 60 wt % to about 70 wt % based on the entire weight of the first layer, while the second layer thereof may include LiF in an amount ranging from about 0.1 wt % to about 10 wt % based on the entire weight of the second layer.

According to another embodiment of the present invention, a rechargeable lithium battery is provided to include a positive electrode; the negative electrode; and an electrolyte.

The SEI passivation film on the surface of the negative active material layer of the negative electrode may be formed through a formation process where the rechargeable lithium battery is charged and discharged several times at an about 0.20V to about 1.5V relative to a lithium metal.

When the rechargeable lithium battery is charged at about 4.0V to about 4.3V after the formation process, the SEI passivation film may include about 0.1 wt % to about 10 wt % of LiF based on the total amount of the SEI passivation film.

When the rechargeable lithium battery is discharged at about 2.7V to about 3.0V after the formation process, the SEI passivation film may include about 10 wt % to about 50 wt % of LiF based on the total amount of the SEI passivation film.

The positive electrode may include a positive active material further including activated carbon.

According to yet another embodiment of the present invention, provided is a method of preparing a rechargeable lithium battery that includes putting an electrode assembly, comprising a positive electrode and a negative electrode, and an electrolyte into a battery case to fabricate a battery precursor; and performing a formation process where the battery precursor is charged and discharged at about 0.20V to about 1.5V relative to a lithium metal to form an SEI passivation film including at least one selected from an organic material and an inorganic material and having an average thickness of about 10 nm to about 50 nm on a surface of a negative active material layer of the negative electrode, wherein the negative electrode includes the negative active material of the negative electrode including a carbon-based material having a peak of about 20 degrees to 30 degrees at a (002) plane in an X-ray diffraction pattern using a CuKα ray.

After the formation process, the rechargeable lithium battery is further charged at about 4.0V to about 4.3V, and the SEI passivation film may include about 0.1 wt % to about 10 wt % based on the total amount of the SEI passivation film.

After the formation process, the rechargeable lithium battery is further discharged at about 2.7V to about 3.0V, and the SEI passivation film may include about 10 wt % to about 50 wt % based on the total amount of the SEI passivation film.

Hereinafter, further embodiments of the present invention will be described in detail.

Here, in one embodiment of the present invention, the deterioration of the rechargeable lithium battery due to volume changes of the negative active material during the high-rate charge and discharge is negligible, and gas generation, substrate detachment, and the like are suppressed.

BRIEF DESCRIPTION OF THE DRAWING

The drawing is a schematic view showing the rechargeable lithium battery according to one embodiment.

DETAILED DESCRIPTION

Exemplary embodiments of the present disclosure will hereinafter be described in more detail. However, these embodiments are only exemplary, and this disclosure is not limited thereto.

When a negative electrode begins to be charged, an SEI passivation film is formed on an active material layer of the negative electrode at about 0.8V and has a biggest volume at about 0.4V thereon. The SEI passivation film includes a component such as LiF and the like. The LiF is an irreversible material not dissolved in an electrolyte and can easily grow to be relatively thick on the surface of the active material layer of the negative electrode, thereby increasing interface resistance.

According to one embodiment of the present invention, an SEI passivation film may be controlled to have an average thickness within a specific range and also, to have a set or predetermined composition on the surface of the active material layer of the negative electrode through a formation process in which a rechargeable lithium battery is charged and discharged several times in a specific voltage range.

Accordingly, the SEI passivation film may suppress its components such as LiF and the like from being detached from the surface of the negative active material layer during high-rate charge and discharge and thus, a new SEI passivation film is suppressed from growing thick again on the surface of the negative active material layer exposed to an electrolyte through a reduction reaction with the electrolyte, thereby forming a rechargeable lithium battery having excellent battery performance during high-rate charge and discharge.

The negative electrode for a rechargeable lithium battery according to one embodiment may include an SEI (solid electrolyte interface) film on the surface of the active material layer of the negative electrode. The SEI passivation film may have an average thickness ranging from about 10 nm to about 50 nm, and specifically about 20 nm to about 50 nm. In one embodiment, when the SEI passivation film having an average thickness within the above range is formed on the surface of the active material layer of the negative electrode, the deterioration of the negative electrode due to volume changes of the negative active material during the charge and discharge at a high-rate of greater than or equal to about 10 C is negligible, and gas generation, active material layer detachment, and the like are suppressed, thereby providing a rechargeable lithium battery operated without degradation during repetitive high-rate charge and discharge.

The SEI passivation film having an average thickness within the range may be formed through a formation process where the rechargeable lithium battery is charged and discharged several times in a region ranging from about 0.20V to about 1.5V relative to a lithium metal.

The SEI passivation film includes at least one material selected from an organic material and an inorganic material.

The organic material may include at least one selected from $ROCO_2Li$ (R is a C1 to C10 alkyl group), $R^1(OCO_2CH_2CH_2)_nLi$ ($R^1$ is a C1 to O10 alkyl group, and n is an integer ranging from about 1 to about 25), $R^2(CH_2CH_2O)_mLi$ ($R^2$ is a C1 to C10 alkyl group, and m is an integer ranging from about 1 to about 25), and $NR^3R^4R^5$ ($R^3$, $R^4$ and $R^5$ are C1 to C10 alkyl groups).

The inorganic material may include at least one selected from $LiF$, $Li_2O$, $Li_2CO_3$ and $Li_xPF_yO$ ($0<x\leq1$, $1\leq y\leq4$).

Among the materials, the SEI passivation film may include LiF. The LiF may be included in an amount ranging from about 30 wt % to about 70 wt %, specifically about 30 wt % to about 50 wt %, and more specifically about 30 wt % to about 40 wt % based on the total amount of the SEI passivation film. In one embodiment, when the SEI passivation film is adjusted to include LiF within the range, an SEI passivation film component is suppressed from being detached, thereby suppressing newly forming a thicker SEI passivation film again, resultantly suppressing performance degradation of the battery during high-rate charge and discharge.

The SEI passivation film having the above composition may be formed through a formation process where the rechargeable lithium battery is charged and discharged several times within a region ranging from about 0.20V to about 1.5V relative to a lithium metal.

In addition, the SEI passivation film may include other different components in various suitable amounts depending on thickness thereof through a formation process under a certain condition.

Specifically, when the SEI passivation film is divided into two layers having equal thicknesses, in which a first layer is apart from the surface of the negative active material layer and a second layer is beneath the first layer, the first layer may include the inorganic material in an amount of greater than or equal to about 60 wt % and the organic material in an amount of less than or equal to about 40 wt % based on the entire weight of the first layer, while the second layer may include the organic material in an amount of greater than or equal to about 60 wt % and the inorganic material in an amount of less than or equal to about 40 wt % based on the entire weight of the second layer.

In addition, the first layer of the SEI passivation film may include the LiF in an amount of about 60 wt % to about 70 wt % based on the total weight of the first layer, while the second layer of the SEI passivation film may include the LiF in an amount of about 0.1 wt % to about 10 wt % based on the total weight of the second layer.

The SEI passivation film on the surface of the active material layer of the negative electrode may have an average thickness within the set or predetermined range and with the set or predetermined component and amount, and may be formed through a formation process in which a rechargeable lithium battery including the negative electrode is charged and discharged several times at a voltage within the set or predetermined range.

Specifically, the SEI passivation film may be formed through a formation process in which a rechargeable lithium battery is charged and discharged several times in a region ranging from about 0.20V to about 1.5V relative to a lithium metal region for a set or predetermined time. More specifically, the formation process may be performed by about 1 to about 10 times charging and discharging in a region ranging from about 0.35V to 0.8V (and specifically from about 0.35V to about 0.5V) relative to a lithium metal region for about 10 minutes to about 5 hours. The charge may be performed in a method of charge and discharge with a constant current, pulse charge and discharge, and charge and discharge in steps. The formation process of charging and discharging a rechargeable lithium battery several times at a voltage within the range may adjust the composition of an SEI passivation film as well as forming the SEI passivation film having an average thickness within the set or predetermined range and with high density. Accordingly, the formation process may suppress components of the SEI passivation film from being detached from the surface of the negative active material layer during high-rate charge and discharge and thus, suppressing the formation of a new thicker SEI passivation film, thereby accomplishing a rechargeable lithium battery having excellent battery performance during high-rate charge and discharge.

The SEI passivation film may be measured regarding average thickness and composition using a film analyzer.

The film analyzer may include an inert chamber in which an inert atmosphere controlled to have moisture ranging from about 0 ppm to about 0.1 ppm and oxygen ranging from about 0 ppm to about 0.5 ppm is maintained and a pretreatment of a sample is performed; a first analyzer connected to the inert chamber, provided with the specimen under the inert atmosphere, and including a X-ray photoelectron spectroscopy (XPS) equipment; an inert holder assembled with the sample in the inert chamber and maintaining the inert atmosphere around the sample; and a second analyzer in which the inert holder is mounted inside and which includes a scanning electron microscope (SEM).

The film analyzer is used to measure average thickness and composition of the SEI passivation film by the following method.

The measurement may include pretreating a sample in an inert chamber, transferring the sample into the first analyzer to measure an average thickness and a composition of the SEI passivation film, transferring the sample into the inert chamber to be assembled with the inert holder, and mounting the inert holder on the second analyzer to examine a shape information of the SEI passivation film.

The pretreatment of the sample may include disassembly of a rechargeable lithium battery after the formation process, cutting an electrode therein into a set or predetermined size to prepare a sample, cleaning the sample, and assembling the sample with a supporting substrate or the inert holder.

The sample may be ion-etched in the first analyzer before being transferred into the inert chamber. In the ion etching, an ion beam may be radiated at an accelerating voltage ranging from about 0.3 kV to about 0.5 kV with a current ranging from about 0.2 µA to about 0.5 µA. A component initially obtained from the ion etching is derived from the only SEI layer, but the component may include both one derived from the SEI layer and one derived from the negative active material layer, as the time for the ion etching increases. In one embodiment, the ion etching may be performed until the resulting component obtained from the ion etching includes about 50 atom % to about 70 atom % of a component derived from the negative active material layer based on the total weight of the resulting components from the ion etching, and the thickness from the surface to the above point refers to the thickness of the SEI layer.

The second analyzer may radiate an electron beam at an accelerating voltage ranging from about 0.5 kV to about 1.0 kV with a current ranging from about 1 µA to about 15 pA.

The film analyzer may be used to analyze shape, thickness, and composition of the SEI passivation film without doing damage to the film prepared in the pretreatment with high precision for a short time.

The negative electrode may include a current collector and a negative active material layer disposed on the current collector.

The current collector may be a copper foil, a nickel foil, a stainless steel foil, a titanium foil, a nickel foam, a copper foam, a polymer substrate coated with a conductive metal, or a combination thereof, but is not limited thereto.

The negative active material layer may include a negative active material, a binder, and optionally a conductive material.

The negative active material includes a carbon-based material, and the carbon-based material has a peak of about 20 degrees to 30 degrees (and specifically about 23 degrees to 28 degrees) at a (002) plane in an X-ray diffraction pattern using a CuKα ray.

The carbon-based material may include at least one selected from soft carbon and graphite.

The carbon-based material may have an average particle diameter of about 1 um to about 20 um, and specifically about 3 um to about 15 um. In one embodiment, when the carbon-based material has an average particle diameter within the above ranges, the deterioration of the negative active material due to volume changes during the charge and discharge at a high-rate of greater than or equal to about 10 C is negligible, and gas generation, substrate detachment, and the like are suppressed.

The binder improves binding properties of active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the negative active material.

The conductive material provides an electrode with conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the liker, a metal-based material of a metal powder or a metal fiber including copper, nickel, aluminum, silver, and the like; a conductive polymer such as a polyphenylene derivative; and mixtures thereof.

Hereinafter, a rechargeable lithium battery including a negative electrode as described above is illustrated in the drawing.

The drawing is a schematic view showing a rechargeable lithium battery according to one embodiment.

Referring to the drawing, a rechargeable lithium battery 100 according to one embodiment includes an electrode assembly including a positive electrode 114, a negative electrode 112 facing the positive electrode 114, a separator 113 interposed between the positive electrode 114 and negative electrode 112, and an electrolyte impregnating the positive electrode 114, the negative electrode 112, and the separator 113, a battery case 120 housing the electrode assembly, and a sealing member 140 sealing the battery case 120.

The negative electrode 112 is the same as described above.

The positive electrode 114 may include a current collector and a positive active material layer disposed on the current collector. The positive active material layer may include a positive active material, a binder, and optionally, a conductive material.

The current collector may be Al (aluminum), but is not limited thereto.

The positive active material may include at least one selected from activated carbon and lithium composite oxide.

The activated carbon is a carbon-based material including amorphous carbon in which graphite-shaped flat crystallites are combined, are porous, and have high specific surface area and high adsorption capability.

The lithium composite oxide may include a composite oxide including at least one of cobalt, manganese, nickel, or combination thereof as well as lithium. In particular, the following compounds may be used:

$Li_aA_{1-b}B_bD_2$ (0.90≤a≤1.8 and 0≤b≤0.5); $Li_aE_{1-b}B_bD_{2-c}D_c$ (0.90≤a≤1.8, 0≤b≤0.5, 0≤c≤0.05); $LiE_{2-b}B_bO_{4-c}D_c$ (0≤b≤0.5, 0≤c≤0.05); $Li_aNi_{1-b-c}Co_bB_cD_\alpha$ (0.90≤a≤1.8, 0≤b≤0.5, 0≤c≤0.05, 0<α≤2); $Li_aNi_{1-b-c}Co_bB_cO_{2-\alpha}F_\alpha$ (0.90≤a≤1.8, 0≤b≤0.5, 0≤c≤0.05, 0<α<2); $Li_aNi_{1-b-c}Co_bB_cO_{2-\alpha}F_2$ (0.90≤a≤1.8, 0≤b≤0.5, 0≤c≤0.05, 0<α<2); $Li_aNi_{1-b-c}Mn_bB_cD_\alpha$ (0.90≤a≤1.8, 0≤b≤0.5, 0≤c≤0.05, 0<α≤2); $Li_aNi_{1-b-c}Mn_bB_cO_{2-\alpha}F_\alpha$ (0.90≤a≤1.8, 0≤b≤0.5, 0≤c≤0.05, 0<α<2); $Li_aNi_{1-b-c}Mn_bB_cO_{2-\alpha}F_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, and is not illustrated in more detail since it is well-known to those who work in the related field.

The binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material provides an electrode with conductivity. Any electrically conductive material may be used as a conductive material unless it causes a chemical change. Examples of the conductive material include: one or more of natural graphite, artificial graphite, carbon black, acetylene black, ketjen black, a carbon fiber, copper, a metal powder or a metal fiber (the metal powder or fiber including nickel, aluminum, silver, and the like), and a polyphenylene derivative.

The positive electrode 114 may be fabricated by a method including mixing an active material, a conductive material, and a binder into an active material composition and coating the composition on a current collector.

The electrode manufacturing method is well known, and thus is not described in detail in the present specification. The solvent can be N-methylpyrrolidone, or water if the negative active material composition uses the water-soluble binder, but it is not limited thereto.

The electrolyte may include a non-aqueous organic solvent and a lithium salt.

The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When a linear carbonate compound and a cyclic carbonate compound are mixed with each other, the dielectric constant increases and the viscosity decreases. The cyclic carbonate compound and linear carbonate compound are mixed together in the volume ratio of about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutylether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like.

The non-aqueous organic solvent may be used singularly or in a mixture. When the organic solvent is used in a mixture, the mixture ratio can be controlled in accordance with a desirable battery performance.

The non-aqueous electrolyte solution may further include an overcharge-inhibiting compound such as ethylene carbonate, pyrocarbonate, and the like.

The lithium salt supplies lithium ions in the battery, and performs a basic operation of a rechargeable lithium battery and improves lithium ion transport between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI, $LiB(C_2O_4)_2$ (lithium bisoxalate borate, LiBOB), and the like.

The lithium salt may be used at a concentration ranging from about 0.1 to about 2.0M. When the lithium salt is included at the concentration range, electrolyte performance and lithium ion mobility may be enhanced due to desired electrolyte conductivity and viscosity.

The separator 113 may be formed as a single layer or a multilayer, and may be made of polyethylene, polypropylene, polyvinylidene fluoride, or a combination thereof.

The rechargeable lithium battery may be fabricated as follows.

An electrode assembly including the positive electrode, the negative electrode and a separator interposed between the positive electrode and the negative electrode is put into a battery case and then the electrolyte is injected into the case to fabricate a battery precursor. The battery precursor undergoes formation process by charging and discharging several times at about 0.20V to about 1.5V relative to a lithium metal, thereby forming the rechargeable lithium battery including an SEI passivation film having a specific average thickness of about 10 nm to about 50 nm. The SEI passivation film is formed on the surface of the active material layer of the negative electrode may be fabricated. The SEI passivation film has a specific composition as well as a specific ranged average thickness.

In more detail, when the fabricated rechargeable lithium battery that undergoes the formation process is charged at about 4.0V to about 4.3V, the second layer (or inner layer) of the SEI passivation film may be initially formed to have an increased organic material and LiF at a relatively low amount. Specifically, this second layer of the SEI passivation film may include about 0.1 wt % to 10 wt % of LiF based on the total (entire) weight amount of the second layer of the SEI passivation film. When the rechargeable lithium battery is discharged at about 2.7V to about 3.0V, the first layer (or outer layer) of the SEI passivation film may then be formed to include about 10 wt % to about 50 wt % of LiF, and specifically about 30 wt % to about 50 wt % based on the total (entire) weight amount of the first layer of the SEI passivation film. As described during charge and discharge, a composition of each of the first and second layers of the SEI passivation film may be different from each other, and when each layer of the SEI passivation film has a composition at the above ranges, the rechargeable lithium battery may realize excellent battery performance even during high-rate charge and discharge.

Hereinafter, the embodiments are illustrated in more detail with reference to examples. However, the following are exemplary embodiments and are not limiting.

Furthermore, what is not described in this specification can be sufficiently understood by those who have knowledge in this field and will not be illustrated here.

Example 1

Soft carbon having an average particle diameter of 5 um, carbon black, styrene-butadiene rubber, and carboxylmethyl cellulose were respectively mixed in a water solvent, at a weight ratio of 92:4:2:2, thereby preparing a negative active material layer composition. The negative active material layer composition was coated on a copper foil, dried, and compressed, thereby fabricating a negative electrode. The negative electrode and lithium metal as a counter electrode were housed in a battery container, and an electrolyte was injected therein, thereby fabricating a coin type cell precursor. Herein, the electrolyte was prepared by mixing ethylenecarbonate (EC), dimethylcarbonate (DMC), and diethyl-carbonate (DEC) in a volume ratio of 3:3:4 and dissolving LiPF$_6$ therein in a concentration of 1.2M.

The cell precursor was charged at 0.35V relative to the lithium metal for 3 hours and then, charged and discharged ten times with 0.1 C/0.1 C in a range of 0.35V to 0.8V in an SEI formation process to fabricate a coin cell.

Example 2

A coin cell was fabricated through a formation process according to the same method as Example 1 except for charging the cell precursor at 0.5V relative to a lithium metal for 3 hours and charged and discharged ten times with 0.1 C/0.1 C in a range of 0.35V to 0.8V.

Example 3

A coin cell was fabricated through a formation process according to the same method as Example 1 except for charging the cell precursor at 0.5V relative to a lithium metal for 1 hour and charged and discharged ten times with 0.1 C/0.1 C in a range of 0.35V to 0.8V.

Comparative Example 1

A coin cell was fabricated according to the same method as Example 1 except no SEI formation process was performed.

Comparative Example 2

A coin cell was fabricated through a formation process according to the same method as Example 1 except for charging the cell precursor at 1.6V relative to a lithium metal for 1 hour and then, charged and discharged ten times with 0.1 C/0.1 C in a range of 0.1V to 1.6V.

Comparative Example 3

A coin cell was fabricated through a formation process according to the same method as Example 1 except for charging the cell precursor at 0.1V for relative to a lithium metal 1 hour and then, charged and discharged ten times with 0.1 C/0.1 C in a range of 0.1V to 1.6V.

Example 4

A coin cell was fabricated through a formation process according to the same method as Example 1 except for respectively mixing graphite having an average particle diameter of 10 um, styrene-butadiene rubber, and carboxylmethylcellulose in a weight ratio of 98:1:1 to prepare a negative active material layer composition.

Example 5

A coin cell was fabricated through a formation process according to the same method as Example 4 except for charging the cell precursor at 0.1V relative to a lithium metal for 3 hours and then, charged and discharged ten times with 0.1 C/0.1 C in a range of 0.35V to 0.8V.

Example 6

A coin cell was fabricated through a formation process according to the same method as Example 4 except for charging the cell precursor at 0.5V relative to a lithium metal for 1 hour and then, charged and discharged ten times with 0.1 C/0.1 C in a range of 0.35V to 0.8V.

Comparative Example 4

A coin cell was fabricated according to the same method as Example 4 except no SEI formation process was performed.

Evaluation 1: Composition and thickness of SEI passivation film on surface of the active material layer of the negative electrode The SEI passivation films on the surfaces of the active material layers of the negative electrodes according to Examples 1 to 6 and Comparative Examples 1 to 4 were measured to determine their compositions and thicknesses. The results are provided in the following Table 1.

The compositions and thicknesses of the SEI passivation films were measured using film analysis equipment. The film analysis equipment is composed of a first analyzer having an inert chamber and an X-ray Photoelectron Spectroscopy (XPS) equipment, and a second analyzer having an inert holder and a scanning electron microscope (SEM). The inert chamber was maintained under an inert atmosphere controlled to have moisture ranging from 0 ppm to 0.1 ppm and oxygen ranging from 0 ppm to 0.5 ppm. The first analyzer, the inert holder, and the second analyzer were all maintained under the inert atmosphere.

The rechargeable lithium battery cells according to Examples 1 to 6 and Comparative Examples 1 to 4 were pretreated under the inert chamber after the formation process. The pretreatment was performed by disassembling the rechargeable lithium battery cells, cutting an electrode therein into a set or predetermined size to take a specimen having an SEI passivation film, and cleaning the specimen. The specimen was put into the first analyzer and analyzed regarding average thickness and composition of the SEI passivation film through the XPS. Herein, when the specimen was ion-etched in the first analyzer, an ion beam was radiated until the resulting component obtained from the ion etching included 60 atom % of a component derived from the negative active material layer based on the total amount of the resulting components from the ion etching. Then, the specimen was transferred to the inert chamber and assembled with the inert holder, and then, the inert holder was mounted on the second analyzer, thereby analyzing the SEI passivation film. Herein, an electron beam having an accelerating voltage of 1 kV was radiated from the second analyzer.

Evaluation 2: High-rate charge and discharge characteristics of rechargeable lithium battery cells The rechargeable lithium battery cells according to Examples 1 to 6 and Comparative Examples 1 to 4 were charged and discharged after the formation process. The results are provided in the following Table 1.

The rechargeable lithium battery cells were charged and discharged at 0.2 C from 1.5V to 0.01V in a constant current and constant voltage method and then, measured regarding their initial discharge capacities.

Then, the rechargeable lithium battery cells were charged at 0.2 C at 0.01V and constant-current discharged at 5 C up to 1.5V and measured regarding their discharge capacities to evaluate output characteristics.

In addition, each of the rechargeable lithium battery cells was charged and discharged at 5 C/5 C, and percentages of discharge capacity at 5 C and the 50$^{th}$ cycles relative to discharge capacity at the initial 0.2 C were calculated to obtain a capacity retention (%).

TABLE 1

| | Thickness of SEI passivation film (nm) | LiF amount of SEI passivation film components (wt %) | Initial discharge capacity (0.2 C) (mAh/g) | 5 C discharge capacity after charging at 0.2 C (mAh/g) | Capacity retention (%) |
|---|---|---|---|---|---|
| Example 1 | 31 | 48 | 248 | 186.0 | 54 |
| Example 2 | 27 | 31 | 256 | 192.1 | 58 |
| Example 3 | 20 | 35 | 253 | 196.5 | 54 |
| Comparative Example 1 | 58 | 15 | 247 | 162.9 | 23 |
| Comparative Example 2 | 73 | 15 | 246 | 160 | 25 |
| Comparative Example 3 | 81 | 29 | 247 | 154 | 20 |
| Example 4 | 46 | 53 | 358 | 286.4 | 48 |
| Example 5 | 41 | 35 | 365 | 291.6 | 50 |
| Example 6 | 35 | 42 | 362 | 295.4 | 45 |
| Comparative Example 4 | 78 | 28 | 355 | 256.2 | 31 |

Referring to Table 1, each of the rechargeable lithium battery cells fabricated through a formation process in which it has been charged and discharged several times at a range of about 0.20V to about 1.5V relative to a lithium metal according to Examples 1 to 6 included an SEI passivation film having an average thickness ranging from 10 nm to 50 nm on the surface of the active material of the negative electrode, and the SEI passivation film included a LiF component in a range of 30 to 70 wt %. On the other hand, the each of the rechargeable lithium battery cells fabricated with no SEI formation process according to Comparative Examples 1 and 4 and the ones fabricated through an SEI formation process out of the voltage region according to Comparative Examples 2 and 3 had an SEI passivation film having an average thickness of greater than 50 nm on the surface of the active material of the negative electrode.

In addition, the rechargeable lithium battery cells according to Examples 1 to 3 had higher 5 C discharge capacity than the ones according to Comparative Examples 1 to 3, while the rechargeable lithium battery cells according to Examples 4 to 6 had higher 5 C discharge capacity than the ones according to Comparative Example 4, accomplishing excellent battery performance during the high-rate charge and discharge.

In addition, the rechargeable lithium battery cells according to Examples 1 to 3 had higher 5 C/0.2 C capacity retention than the ones according to Comparative Examples 1 to 3, while the ones according to Examples 4 to 6 had higher 5 C/0.2 C capacity retention than the one according to Comparative Example 4. Accordingly, a rechargeable lithium battery cell including a negative electrode including an SEI passivation film having a set or predetermined thickness on the surface of its active material layer had less resistance and had excellent cycle-life characteristic.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative electrode for a rechargeable lithium battery, the negative electrode comprising:
    a negative active material layer comprising a carbon-based material having a peak of about 20 degrees to 30 degrees at a (002) plane in an X-ray diffraction pattern using a CuKα ray; and
    an SEI (solid electrolyte interface) passivation film on a surface of the negative active material layer of the negative electrode and having an average thickness of about 20 nm to about 46 nm, the SEI passivation film comprising:
    an organic material and LiF;
    wherein the LiF is included in an amount of about 31 weight % to about 53 weight % based on the total weight of the SEI passivation film;
    a weight % of the LiF being smaller than a weight % of the organic material at the surface of the negative active material layer of the negative electrode.

2. The negative electrode of claim 1, wherein the carbon-based material comprises at least one selected from soft carbon and graphite.

3. The negative electrode of claim 1, wherein the carbon-based material has an average particle diameter of about 1 um to about 20 um.

4. The negative electrode of claim 1, wherein the organic material comprises at least one selected from $ROCO_2Li$ (R is a C1 to C10 alkyl group), $R^1(OCO_2CH_2CH_2)_nLi$ ($R^1$ is a C1 to C10 alkyl group, and n is an integer ranging from about 1 to about 25), $R^2(CH_2CH_2O)_mLi$ ($R^2$ is a C1 to C10 alkyl group, and m is an integer ranging from about 1 to about 25), and $NR^3R^4R^5$ ($R^3$, $R^4$ and $R^5$ are C1 to C10 alkyl groups).

5. The negative electrode of claim 1, wherein the inorganic material comprises at least one selected from LiF, $Li_2O$, $Li_2CO_3$ and $Li_xPF_yO$ ($0<x\leq1$, $1\leq y\leq4$).

6. The negative electrode of claim 1, wherein the SEI passivation film comprises:
    a first layer comprising the inorganic material in an amount ranging from greater than or equal to about 60 weight % and the organic material in an amount ranging from less than or equal to about 40 weight % based on the entire weight of the first layer; and
    a second layer comprising the organic material in an amount ranging from greater than or equal to about 60 weight % and the inorganic material in an amount ranging from less than or equal to 40 weight % based on the entire weight of the second layer,
    wherein the first layer and the second layer have equal thicknesses, and
    wherein the first layer forms the surface of the SEI passivation film, and the second layer is beneath the first layer.

7. The negative electrode of claim 6, wherein the first layer of the SEI passivation film comprises LiF in an amount ranging from about 60 weight % to about 70 weight % based on the entire weight of the first layer, and the second layer of the SEI passivation film comprises LiF in an amount ranging from about 0.1 weight % to 10 weight % based on the entire weight of the second layer.

8. The negative electrode of claim 1, wherein the SEI passivation film comprises:

a first layer comprising LiF in an amount ranging from about 60 weight % to about 70 weight % based on the entire weight of the first layer; and a second layer comprising LiF in an amount ranging from about 0.1 weight % to 10 weight % based on the entire weight of the second layer, wherein the first layer and the second layer have equal thicknesses, and wherein the first layer forms the surface of the SEI passivation film, and the second layer is beneath the first layer.

\* \* \* \* \*